(12) United States Patent
Goto et al.

(10) Patent No.: US 11,300,036 B2
(45) Date of Patent: Apr. 12, 2022

(54) VEHICLE DRIVE-FORCE TRANSMITTING APPARATUS

(71) Applicant: TOYOTA JIDOSHA KABUSHIKI KAISHA, Toyota (JP)

(72) Inventors: Jun Goto, Toyota (JP); Makoto Tomita, Toyota (JP); Eiji Ichioka, Toyota (JP); Tetsuo Hori, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 278 days.

(21) Appl. No.: 16/734,451

(22) Filed: Jan. 6, 2020

(65) Prior Publication Data
US 2020/0240314 A1 Jul. 30, 2020

(30) Foreign Application Priority Data
Jan. 25, 2019 (JP) .............................. JP2019-011718

(51) Int. Cl.
| | |
|---|---|
| *F16H 61/00* | (2006.01) |
| *F16H 57/04* | (2010.01) |
| *F01P 11/02* | (2006.01) |
| *F01P 7/04* | (2006.01) |
| *F01P 11/08* | (2006.01) |
| *F01P 3/00* | (2006.01) |

(52) U.S. Cl.
CPC ........... *F01P 7/048* (2013.01); *F01P 11/0276* (2013.01); *F01P 11/08* (2013.01); *F16H 57/04* (2013.01); *F01P 2003/006* (2013.01)

(58) Field of Classification Search
CPC ............ F16H 61/0031; F16H 61/0021; F16H 57/0441; F16H 57/0436; F16H 57/0434; F16H 57/045; F01P 2005/105; F01P 11/0276; F01P 11/08
See application file for complete search history.

(56) References Cited

U.S. PATENT DOCUMENTS

| | | | |
|---|---|---|---|
| 2005/0115770 A1* | 6/2005 | Sandrart | F16H 57/0413 184/6.2 |
| 2016/0369853 A1* | 12/2016 | Sugiura | F01M 1/10 |
| 2017/0009618 A1* | 1/2017 | Cui | F02B 75/18 |
| 2017/0219085 A1* | 8/2017 | Kiyokami | F01M 1/02 |
| 2018/0045090 A1* | 2/2018 | Kiyokami | F16H 57/0441 |

(Continued)

FOREIGN PATENT DOCUMENTS

JP 2017-137991 A 8/2017

*Primary Examiner* — Long T Tran
(74) *Attorney, Agent, or Firm* — Oblon, McClelland, Maier & Neustadt, L.L.P.

(57) ABSTRACT

A vehicle drive-force transmitting apparatus including: a casing; a drive-force transmitting mechanism disposed in the casing; and first and second oil pumps configured to suck, through respective inlet ports thereof, oil stored in a bottom portion of a casing, such that the drive-force transmitting mechanism is lubricated by the oil pumped up by the first and second oil pumps. The casing is provided with a drain hole through which the oil stored in the bottom portion of the casing is to be discharged to an exterior of the casing. A position of opening of the inlet port of the first oil pump is lower than a position of a lower end of the drain hole, and a position of opening of the inlet port of the second oil pump is higher than the position of the lower end of the drain hole.

6 Claims, 3 Drawing Sheets

(56) References Cited

U.S. PATENT DOCUMENTS

| | | | | |
|---|---|---|---|---|
| 2018/0045295 A1* | 2/2018 | Kiyokami | ............. | B60K 6/445 |
| 2018/0202438 A1* | 7/2018 | Saito | ....................... | F04C 2/102 |
| 2018/0334025 A1* | 11/2018 | Hashimoto | ............ | B60K 6/365 |
| 2019/0081537 A1* | 3/2019 | Kiyokami | ............. | H02K 7/116 |

* cited by examiner

VEHICLE DRIVE-FORCE TRANSMITTING APPARATUS

This application claims priority from Japanese Patent Application No. 2019-011718 filed on Jan. 25, 2019, the disclosure of which is herein incorporated by reference in its entirety.

FIELD OF THE INVENTION

The present invention relates to a drive-force transmitting apparatus that is to be installed in a vehicle, more particularly, to lubrication of a drive-force transmitting mechanism that is disposed in the drive-force transmitting apparatus.

BACKGROUND OF THE INVENTION

There is proposed a drive-force transmitting apparatus that is to be installed in a vehicle including a drive force source and drive wheels, wherein the drive-force transmitting apparatus includes: a casing; a drive-force transmitting mechanism which is disposed in the casing and which is configured to transmit a drive force from the drive force source and to the drive wheels; and first and second oil pumps which are disposed in the casing and which are configured to suck oil stored in a bottom portion of the casing, such that the drive-force transmitting mechanism is lubricated by the oil pumped up by the first and second oil pumps. Such a drive-force transmitting apparatus is disclosed in JP-2017-137991A.

SUMMARY OF THE INVENTION

By the way, the casing is provided with a drain hole through which the oil stored in the bottom portion of the casing is to be discharged to an exterior of the casing. The drain hole is normally closed by a drain plug. When the oil is to be changed to new oil, the drain plug is dropped or removed from the drain hole whereby the oil stored in the bottom portion of the casing is discharged through the drain hole to the exterior of the casing. There could be a case in which the oil leaks or is discharged to the exterior of the casing, for example, in the event of removable of the drain plug from the drain hole, and the vehicle runs in an oil-less state in which the oil is absent in an interior of the casing. In this case, there is a risk that galling could be caused in the drive-force transmitting mechanism.

The present invention was made in view of the background art described above. It is therefore an object of the present invention to provide a drive-force transmitting apparatus that is to be installed in a vehicle, wherein the drive-force transmitting apparatus is capable of restraining galling in the drive-force transmitting mechanism even when the oil is discharged through the drain hole.

The above object is achieved according to the following aspects of the present invention.

According to a first aspect of the invention, there is provided a drive-force transmitting apparatus that is to be installed in a vehicle including a drive force source and drive wheels, the drive-force transmitting apparatus comprising: a casing; a drive-force transmitting mechanism which is disposed in the casing and which is configured to transmit a drive force from the drive force source and to the drive wheels; and first and second oil pumps which are disposed in the casing and which are configured to suck, through respective inlet ports thereof, oil stored in a bottom portion of the casing, such that the drive-force transmitting mechanism is lubricated by the oil pumped up by the first and second oil pumps, wherein the casing is provided with a drain hole through which the oil stored in the bottom portion of the casing is to be discharged to an exterior of the casing, and wherein a position of opening of the inlet port of the first oil pump is lower than a position of a lower end of the drain hole, and a position of opening of the inlet port of the second oil pump is higher than the position of the lower end of the drain hole, in an apparatus installed state in which the drive-force transmitting apparatus is installed in the vehicle. It is noted that the above-described feature that "a position of opening of the inlet port of the first oil pump is lower than a position of a lower end of the drain hole, and a position of opening of the inlet port of the second oil pump is higher than the position of the lower end of the drain hole, in the apparatus installed state" may be alternatively defined as a feature that "an oil storage portion as the bottom portion of the casing in which the oil is to be stored, is defined by a bottom wall of the casing, the bottom wall being opposed to the opening of the inlet port of the first oil pump and the opening of the inlet port of the second oil pump, wherein a distance from the bottom wall to the position of the opening of the inlet port of the first oil pump is smaller than a distance from the bottom wall to the position of the lower end of the drain hole, and wherein a distance from the bottom wall to the position of the opening of the inlet port of the second oil pump is larger than the distance from the bottom wall to the position of the lower end of the drain hole". Further, the drive-force transmitting apparatus may further include an oil discharge-rate obtainer configured to obtain a rate of discharge of the oil from the second oil pump.

According to a second aspect of the invention, in the drive-force transmitting apparatus according to the first aspect of the invention, the drive-force transmitting mechanism includes an output portion configured to output the drive force to the drive wheels, wherein the first oil pump is to be driven by the output portion, and wherein the output portion is to be lubricated by the oil pumped up by the first oil pump.

According to a third aspect of the invention, in the drive-force transmitting apparatus according to the second aspect of the invention, the drive-force transmitting mechanism includes an input portion configured to receive the drive force from the drive force source, wherein the second oil pump is to be driven by the input portion, and wherein the input portion is to be lubricated by the oil pumped up by the second oil pump.

According to a fourth aspect of the invention, in the drive-force transmitting apparatus according to any one of the first through third aspects of the invention, the input portion is to be lubricated by the oil pumped up by the first oil pump as well as by the oil pumped up by the second oil pump.

In the drive-force transmitting apparatus according to the first aspect of the invention, even in a case in which the oil becomes substantially absent in an interior of the casing, the first oil pump can suck the oil remaining in a low portion of the interior of the casing which is lower than the lower end of the drain hole, so that it is possible to lubricate the drive-force transmitting mechanism by using the oil pumped up by the first oil pump. Further, in this case, the second oil pump is unable to suck the oil, thereby causing a situation in which the oil is not discharged from the second oil pump and/or a situation in which a temperature of the oil is increased. Thus, the oil-less state can be detected in an early stage thereby making possible to cope with the oil-less state.

Therefore, it is possible to restrain occurrence of the galling in the drive-force transmitting mechanism.

In the drive-force transmitting apparatus according to the second aspect of the invention, the first oil pump is driven by the output portion, and the oil pumped up by the first oil pump is supplied to the output portion, so that the output portion can be suitably lubricated.

In the drive-force transmitting apparatus according to the third aspect of the invention, the second oil pump is driven by the input portion, and the oil pumped up by the second oil pump is supplied to the input portion, so that the input portion can be suitably lubricated.

In the drive-force transmitting apparatus according to the fourth aspect of the invention, the input portion is lubricated by the oil pumped up by the first oil pump as well as by the oil pumped up by the second oil pump, so that the input portion can be further suitably lubricated.

DETAILED DESCRIPTION OF PREFERRED EMBODIMENT

Hereinafter, a preferred embodiment of the invention will be described in detail with reference to the accompanying drawings. The figures of the drawings are simplified or deformed as needed, and each portion is not necessarily precisely depicted in terms of dimension ratio, shape, etc.

Embodiment

Figure 1:
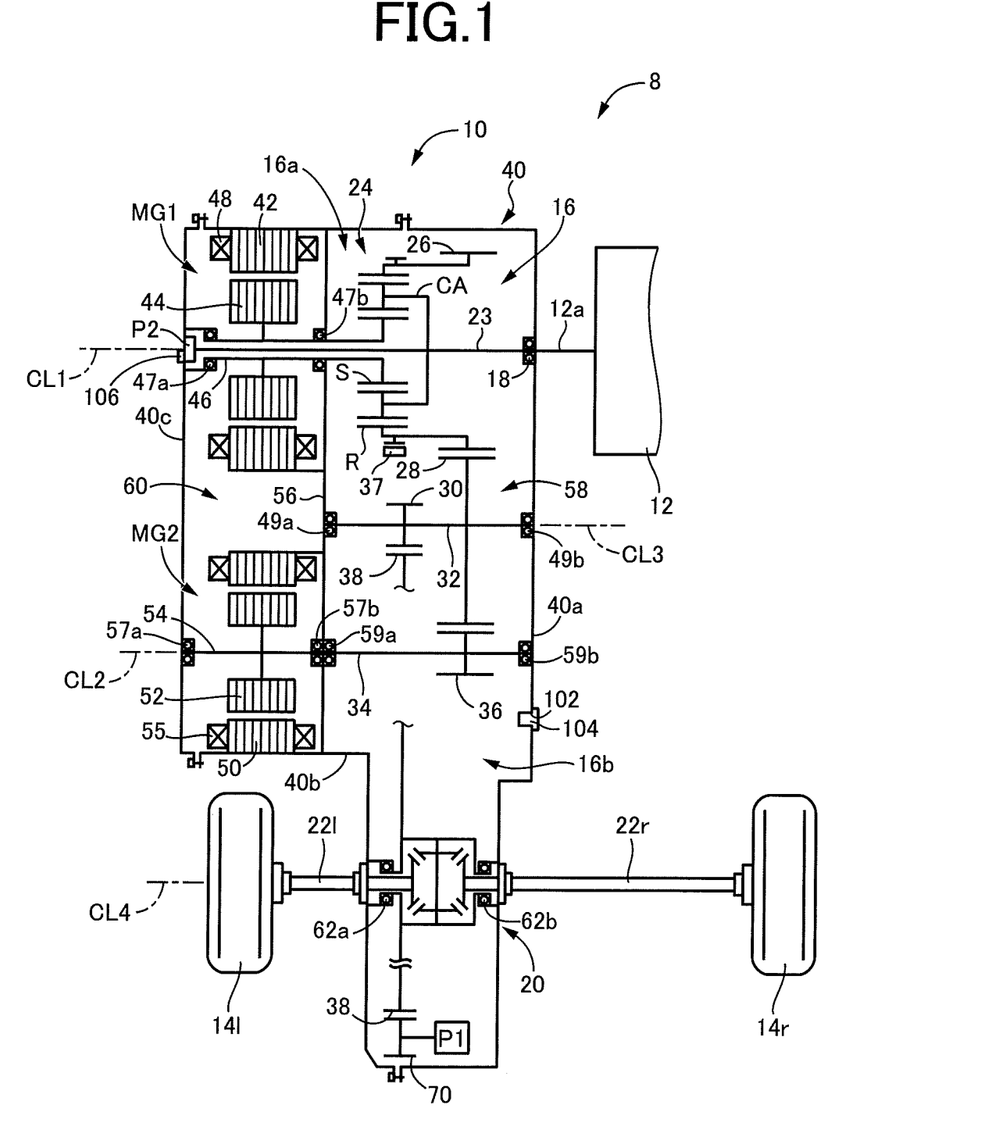
FIG. 1 is a view schematically showing, by way of example, construction of a vehicle drive-force transmitting apparatus to which the present invention is applied.

FIG. 1 is a view schematically showing, by way of example, construction of a drive-force transmitting apparatus 10 to which the present invention is applied, wherein the drive-force transmitting apparatus 10 is to be installed in a vehicle 8. The drive-force transmitting apparatus 10 is to be used advantageously in the vehicle 8 of FF (front engine/front drive) system. The drive-force transmitting apparatus 10 is a drive-force transmitting apparatus of hybrid type, which is to be disposed between an engine 12 and drive wheels 14 of the vehicle 8, so as to transmit a drive force outputted from the engine 12 as a drive-force source and a drive force outputted from a second electric motor MG2 as another main drive-force source, to the right and left drive wheels 14r, 14l (hereinafter simply referred to as "drive wheels 14" unless they are to be distinguished from each other) via a differential device 20 and right and left axles 22r, 22l (hereinafter simply referred to as "axles 22" unless they are to be distinguished from each other). The drive-force transmitting apparatus 10 includes a drive-force transmitting mechanism 16 which is disposed within the casing 40 as a non-rotary member and which is configured to transmit the drive force of the engine 12 and the drive force of the second electric motor MG2, to the drive wheels 14.

As shown in FIG. 1, the drive-force transmitting apparatus 10 includes the above-described differential device 20, the above-described axles 22, an input shaft 23, a planetary gear device 24, an output gear 26, a counter gear 28, a differential drive gear 30, a counter shaft 32, a drive-force transmitting shaft 34, a reduction gear 36, a first electric motor MG1 and the above-described second electric motor MG2. The input shaft 23 is disposed to be rotatable about a first axis CL1. The planetary gear device 24, first electric motor MG1 and output gear 26 are disposed to be coaxial with the input shaft 23 and are located radially outside the input shaft 23. The drive-force transmitting shaft 34 is disposed to be rotatable about a second axis CL2. The second electric motor MG2 is disposed to be coaxial with the drive-force transmitting shaft 34 so as to be rotatable about the second axis CL2. The reduction gear 36 is disposed on the drive-force transmitting shaft 34. The counter shaft 32 is disposed to be rotatable about a third axis CL3. The counter gear 28 and differential drive gear 30 are disposed on the counter shaft 32. The differential device 20 and the axles 22 are disposed to be rotatable about a fourth axis CL4. All of these rotary members are disposed inside a casing 40. The drive-force transmitting apparatus 10 further includes a parking lock mechanism 37 configured to stop rotation of the output gear 26. It is noted that all of the first through fourth axes CL1-CL4 are rotary axes that are parallel to a width direction of the vehicle 8. It is also noted that the casing 40 corresponds to "casing" recited in the appended claims.

The input shaft 23 is connected to the engine 12 through members such as a crank shaft 12a and a damper (not shown), in a drive-force transmittable manner. The input shaft 23 is held, through members such as a bearing 18, by the casing 40 as a non-rotary member, such that the input shaft 23 is rotatable about the first axis CL1.

The planetary gear device 24, which is disposed to be coaxial with the first axis CL1, is a single-pinion type planetary gear device (differential mechanism) that includes a sun gear S, a carrier CA and a ring gear R. The planetary gear device 24 serves as a drive-force distributing mechanism configured to distribute a drive force of the engine 12 to the output gear 26 and the first electric motor MG1. The sun gear S of the planetary gear device 24 is connected to the first electric motor MG1 in a drive-force transmittable manner. The carrier CA of the planetary gear device 24 is connected to the engine 12 through the input shaft 23 and the crank shaft 12a in a drive-force transmittable manner. The ring gear R of the planetary gear device 24 is connected to the output gear 26 in a drive-force transmittable manner. It is noted that the ring gear R and the output gear 26 are formed integrally with each other, namely, are constituted by a compound gear.

A second oil pump P2 is disposed on the first axis CL1, and is located in one of opposite end portions, which is remote from the engine 12, in an axial direction of the input shaft 23. The second oil pump P2 is to be driven by the engine 12. The second oil pump P2 includes a drive gear (not shown) that is connected to an axial end portion of the input shaft 23, such that the second oil pump P2 is to be driven by the engine 12 through the input shaft 23.

The first electric motor MG1 is disposed in a position adjacent to the planetary gear device 24, with a partition wall 56 (that is a part of the casing 40) being located between the first electric motor MG1 and the planetary gear device 24 in a direction of the first axis CL1. The first electric motor MG1 includes an annular-shaped stator 42 that is unrotatably fixed to the casing 40 as the non-rotary member, an annular-shaped rotor 44 disposed on an inner peripheral side of the stator 42, and a rotor shaft 46 fixed in an inner circumferential surface of the rotor 44. The stator 42 is provided with a stator coil 48 that is wound on the stator 42. The rotor shaft 46 is held at its axially opposite end portions by the casing 40 through a pair of bearings 47a, 47b, such that the rotor shaft 46 is rotatable about the first axis CL1.

The output gear 26 is connected to the ring gear R of the planetary gear device 24, and meshes with the counter gear 28 that is disposed on the counter shaft 32. The counter shaft 32 is held at its axially opposite end portions by the casing 40 through a pair of bearings 49a, 49b, such that the counter shaft 32 is rotatable about the third axis CL3.

The second electric motor MG2 and the reduction gear 36 are disposed to be rotatable about the second axis CL2, with the partition wall 56 being located between the second electric motor MG2 and the reduction gear 36 in a direction of the second axis CL2.

The second electric motor MG2 includes an annular-shaped stator 50 that is unrotatably fixed to the casing 40 as the non-rotary member, an annular-shaped rotor 52 disposed on an inner peripheral side of the stator 50, and a rotor shaft 54 fixed in an inner circumferential surface of the rotor 52. The stator 50 is provided with a stator coil 55 that is wound on the stator 50. The rotor shaft 54 is held at its axially opposite end portions by the casing 40 through a pair of bearings 57a, 57b, such that the rotor shaft 54 is rotatable about the second axis CL2.

The reduction gear 36 is formed integrally with the drive-force transmitting shaft 34, and meshes with the counter gear 28 disposed on the counter shaft 32. The number of teeth of the reduction gear 36 is smaller than the number of teeth of the counter gear 28. Thus, rotation of the second electric motor MG2 is transmitted to the counter shaft 32 through the reduction gear 36 and the counter gear 28, such that a rotational speed of the counter shaft 32 is made lower than a rotational speed of the second electric motor MG2. The drive-force transmitting shaft 34 is held at its axially opposite end portions by the casing 40 through a pair of bearings 59a, 59b, such that the drive-force transmitting shaft 34 is rotatable about the second axis CL2.

The counter gear 28 and the differential drive gear 30 are disposed on the counter shaft 32, unrotatably relative to the counter shaft 32 that is to be rotated about the third axis CL3. The counter gear 28 meshes with the output gear 26 and the reduction gear 36 so that the drive force outputted from the engine 12 and/or the drive force outputted from the second electric motor MG2 are to be transmitted. The differential drive gear 30 meshes with a differential ring gear 38 of the differential device 20. Thus, when the drive force drive force outputted from the engine 12 and/or the drive force outputted from the second electric motor MG2 are transmitted to the counter shaft 32 through the output gear 26 and/or the reduction gear 36, the drive force or forces are transmitted to the differential device 20 through the differential drive gear 30.

The differential device 20 and the pair of axles 22r, 22l are disposed to be rotatable about the fourth axis CL4. The differential ring gear 38 of the differential device 20 meshes with the differential drive gear 30 so that the drive force outputted from the engine 12 and/or the drive force outputted from the second electric motor MG2 are to be inputted to the differential device 20 through the differential ring gear 38.

The differential device 20 is constituted by a well-known differential mechanism, and is configured to transmit the drive force to the right and left axles 22r, 22l while allowing rotation of each of the axles 22r, 22l relative to the other of the axles 22r, 22l. It is noted that detailed description of the differential device 20, which is a known device, is not provided. The differential device 20 is held, at its opposite end portions that are opposite to each other in a direction of the fourth axis CL4, by the casing 40 through a pair of bearings 62a, 62b, such that the differential device 20 is rotatable about the fourth axis CL4. Further, the differential ring gear 38 of the differential device 20 meshes with a pump drive gear 70 of a first oil pump P1. The first oil pump P1 is a mechanical oil pump that is to be mechanically rotated or driven together with rotation of the differential ring gear 38 through the pump drive gear 70 that meshes with the differential ring gear 38.

In the drive-force transmitting apparatus 10 constructed as described above, the drive force of the engine 12 is transmitted to the right and left drive wheels 14r, 14l through the planetary gear device 24, output gear 26, counter gear 28, counter shaft 32, differential drive gear 30, differential device 20 and right and left axles 22r, 22l. Further, the drive force of the second electric motor MG2 is transmitted to the right and left drive wheels 14r, 14l through the rotor shaft 54, drive-force transmitting shaft 34, reduction gear 36, counter gear 28, counter shaft 32, differential drive gear 30, differential device 20 and right and left axles 22r, 22l.

The casing 40 is constituted by a housing 40a, an axle case 40b and a case cover 40c that are fixed to one another. The axle case 40b opens in its opposite ends that are opposite to each other in the direction of the first axis CL1. The axle case 40b is fixedly connected at one of the openings to the housing 40a by bolts, and is fixedly connected at the other of the openings to the case cover 40c by bolts.

The axle case 40b is provided with the partition wall 56 that extends in a direction perpendicular to the first axis CL1. By the partition wall 56, an interior of the casing 40 is sectioned into a gear room 58 and a motor room 60, such that various gears or devices such as the planetary gear device 24, output gear 26, counter gear 28, reduction gear 36 and differential device 20 are disposed within the gear room 58 and such that the first and second electric motors MG1, MG2 are disposed within the motor room 60. It is noted that the second oil pump P2 is disposed within the motor room 60.

Figure 2:
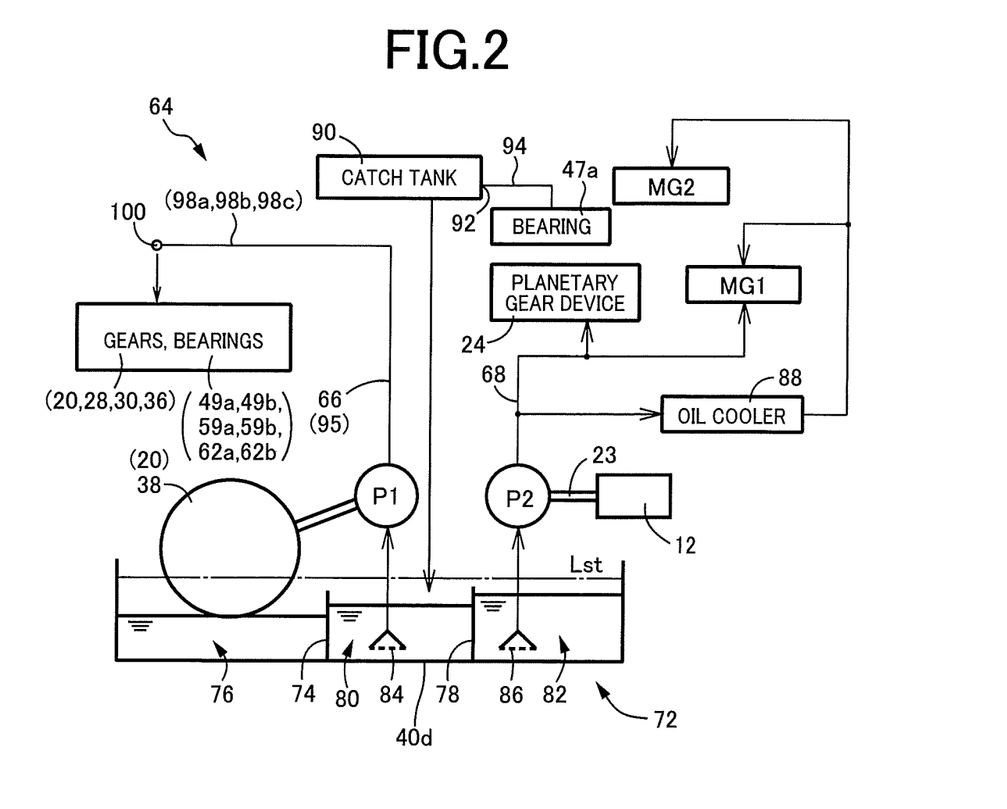
FIG. 2 is a circuit diagram schematically showing, by way of example, construction of a lubrication device that is provided in the drive-force transmitting apparatus of FIG. 1.

The drive-force transmitting apparatus 10 further includes a lubrication device 64 shown in FIG. 2. The lubrication device 64 is provided with suction devices in the form of the first and second oil pumps P1, P2, which are configured to suck oil (lubricant) stored in a bottom portion of the casing 40. Thus, each of the first and second oil pumps P1, P2 is configured to supply the oil to assigned ones of lubrication-required parts or elements of the drive-force transmitting apparatus 10. That is, the lubrication device 64 is configured to lubricate various parts or elements disposed within the casing 40, by using the oil scooped by the first and second oil pumps P1, P2.

The drive-force transmitting mechanism 16 is constituted by rotary members such as various gears configured to transmit the drive forces of the engine 12 and the second electric motor MG2 to the drive wheels 14, and also bearings rotatably support these rotary members. Specifically, the input shaft 23, planetary gear device 24, first electric motor MG1, output gear 26, counter gear 28, counter shaft 32, differential drive gear 30, differential device 20, second electric motor MG2, drive-force transmitting shaft 34 and reduction gear 36 correspond to the rotary members constituting the drive-force transmitting mechanism 16. The bearings 18, 47a, 47b, 49a, 49b, 57a, 57b, 59a, 59b, 62a, 62b correspond to the bearings constituting the drive-force transmitting mechanism 16.

The drive-force transmitting mechanism 16 is sectioned into an input portion 16a configured to receive the drive force from the engine 12, and an output portion 16b configured to output the drive force from the engine 12, to the drive wheels 14. The input portion 16a corresponds to a drive-force transmitting path through which the drive force of the engine 12 is to be distributed to the first electric motor MG1 and the output gear 26. That is, the input portion 16a corresponds to rotary members (such as input shaft 23, planetary gear device 24 and first electric motor MG1) which constitute the drive-force transmitting path from the input shaft 23 connected to the engine 12 to the ring gear R of the planetary gear device 24. Meanwhile, the output portion 16b corresponds to rotary members (such as the output gear 26, counter gear 28, counter shaft 32, differential drive gear 30, differential device 20, axles 22, second electric motor MG2, drive-force transmitting shaft 34 and reduction gear 36) which constitute a drive-force transmitting path through which the drive force inputted from the input portion 16a is to be transmitted to the drive wheels 14.

The first and second oil pumps P1, P2 are connected to respective first and second supply passages 66, 68 that are independent from each other, and are configured to suck the oil stored in an oil storage portion 72 provided in the bottom portion of the casing 40 and to discharge the sucked oil to the respective first and second supply passages 66, 68. The first oil pump P1 is to be driven by the differential ring gear 38 of the differential device 20 constituting the output portion 16b. The second oil pump P2 is to be driven by the input shaft 23 constituting the input portion 16a.

The oil storage portion 72 is constituted by the casing 40 as such, and includes a first storage portion 76, a second storage portion 80 and a third storage portion 82, which are arranged in a longitudinal direction of the vehicle 8 (hereinafter referred to as "vehicle longitudinal direction" or "longitudinal direction"). The first storage portion 76 is located on a rear side of the other storage portion (i.e., the second and third storage portions 80, 82) in the vehicle longitudinal direction, and is sectioned from the other storage portion by a first partition wall 74. The first storage portion 76 is located on a lower side of the differential device 20 in a vertical direction of the vehicle 8 (hereinafter referred to as "vehicle vertical direction" or "vertical direction").

The above-described other storage portion, which is other than the first storage portion 76, is sectioned by a second partition wall 78 into two storage portions, i.e., the second and third storage portions 80, 82. The second storage portion 80 is adjacent to the first storage portion 76, and is located between the first and third storage portions 76, 82 in the vehicle longitudinal direction. The third storage portion 82 is adjacent to the second storage portion 80, and is located on a front side of the second storage portion 80 in the vehicle longitudinal direction. A first inlet port 84 of the first oil pump P1 is located within the second storage portion 80, while a second inlet port 86 of the second oil pump P2 is located within the third storage portion 82. The inlet ports 84, 86 are connected to the respective first and second oil pumps P1, P2 through respective inlet passages that are provided independently of each other. It is noted that the first inlet port 84 and the second inlet port 86 correspond to "inlet port of said first oil pump" and "inlet port of said second oil pump" recited in the appended claims, respectively.

The first and second partition walls 74, 78 cooperate to serve as an oil-level-balance limiting portion configured to limit a balance of oil level while allowing or limiting passage of the oil among the first, second and third storage portions 76, 78, 82. For example, in FIG. 2, one-dot chain line indicates a stationary oil level Lst that is an oil level in a static state in which change of the oil level is stopped with operations of both of the oil pumps P1, P2 being stopped during stop of the vehicle 8. As shown in FIG. 2, in the static state, the oil supplied to various elements or parts of the drive-force transmitting mechanism 16 is returned down to the oil storage portion 72 whereby the oil level becomes higher than upper ends of the first and second partition walls 74, 78 so that the passage of the oil among the first, second and third storage portions 76, 78, 82 is allowed and accordingly the oil level is made even among the first, second and third storage portions 76, 78, 82. However, when the vehicle 8 is running or when the oil pumps P1, P2 are operated, the oil is supplied to various elements or parts of the drive-force transmitting mechanism 16 and accordingly an amount stored in the oil storage portion 72 is reduced whereby the oil level becomes lower than the upper ends of the first and second partition walls 74, 78 so that the passage of the oil among the first, second and third storage portions 76, 78, 82 is limited by first and second partition walls 74, 78 and accordingly the oil level is made uneven among the first, second and third storage portions 76, 78, 82, as indicated by solid lines in FIG. 2. That is, the oil level in each of the first, second and third storage portions 76, 78, 82 is changeable individually from the others of the storage portions 76, 78, 82.

A position of the upper end of the first partition wall 74 and a position of the upper end of the second partition wall 78 are higher than a position of a lower end of the differential device 20 in the vertical direction, so that a part of the differential device 20 is immersed in the oil in the static state in which the oil level is higher than the upper ends of the first and second partition walls 74, 78. With the differential device 20 being partially immersed in the oil, the oil is scooped up by gears such as the differential ring gear 38 upon start of running of the vehicle 8, whereby the oil is sprayed onto various elements or parts of the drive-force transmitting apparatus 10. Thus, a satisfactory lubrication state can be established even when the vehicle 8 starts to run, namely, when a sufficient amount of the oil is difficult to be supplied by the first oil pump P1.

When the oil pumps P1, P2 are operated, for example, during running of the vehicle 8, the oil is sucked by the oil pumps P1, P2 and is scooped up by gears such as the differential ring gear 38 that are rotated depending on a running speed V of the vehicle 8 whereby the oil level is reduced to be lower than the upper ends of the second partition walls 74, 78. The oil level in the first storage portion 76 is dependent on a balance (equilibrium) between an amount of the oil scooped up by the gears such as the differential ring gear 38 and an amount of the oil returned to the first storage portion 76. The oil level in the second storage portion 80 is dependent on a balance between an amount of the oil sucked by the first oil pump P1 and an amount of the oil returned to the second storage portion 80. The oil level in the third storage portion 82 is dependent on a balance between an amount of the oil sucked by the second oil pump P2 and an amount of the oil returned to the third storage portion 82. In the present embodiment, a volume of the first storage portion 76, i.e., a position and a shape of the first partition wall 74, for example, are determined such that the oil level in the first storage portion 76 is reduced with higher priority whereby stirring of the oil by rotation of the differential device 20 is restrained and accordingly so-called "stirring loss" is reduced. Further, the oil level in the second storage portion 80 in which the first inlet port 84 is disposed and the oil level in the third storage portion 82 in which the second inlet port 86 is disposed are made higher than the oil level in the first storage portion 76, for thereby restraining air suck by the oil pumps P1, P2 which could be caused if the inlet ports 84, 86 are exposed above the oil level, so that the oil is suitably sucked by the oil pumps P1, P2 whereby stable supply of the oil to the lubrication-required elements can be made.

Further, since the second and third storage portions 80, 82 are sectioned, by provision of the second partition wall 78, from each other in the vehicle longitudinal direction, a width of each of the second and third storage portions 80, 82 measured in the vehicle longitudinal direction is made small whereby uneven distribution of the oil due to change of running speed of the vehicle 8 and change of posture of the vehicle 8 which is caused by, for example, road slope, is restrained and accordingly change of the oil level is reduced. Thus, it is possible to further appropriately restrain air suction by the oil pumps P1, P2 connected to the respective inlet ports 84, 86 that are disposed in the respective oil storage portions 80, 82. Further, the second partition wall 78 has, in its lower end portion in the vertical direction, minute aperture or apertures 78a through which the second and third storage portions 80, 82 are in communication with each other. With the apertures 78a being formed through the second partition wall 78, even when an amount of the oil stored in the second storage portion 80 becomes small, the oil stored in the third storage portion 82 flows into the second storage portion 80 through the apertures 78a whereby the amount of the oil stored in the second storage portion 80 is maintained.

The second supply passage 68 connected to an outlet port of the second oil pump P2 is configured to supply the oil to the lubrication-required elements such as the planetary gear device 24, first electric motor MG1, second electric motor MG2 and bearings (47a, 47b, 57a, 57b) rotatably supporting the rotor shafts 46, 54 of the respective first and second electric motors MG1, MG2. The second supply passage 68 is provided with an oil cooler 88 that is configured to cool the oil, so as to the supply the cooled oil to the first and second electric motors MG1, MG2, for thereby cooling the first and second electric motors MG1, MG2 and preventing the motors MG1, MG2 from being excessively heated. The oil cooler 88 is configured to cool the oil, for example, through a heat exchanger using air cooling or water cooling. Since the second oil pump P2 is driven by the engine 12 that can be driven even during stop of running of the vehicle 8, it is possible to cause the second oil pump P2 to suck the oil at a rate that is not dependent on the running speed V, so that the oil can be supplied to the lubrication-required elements, irrespective of whether the vehicle 8 is running or not.

The first oil pump P1 is to be rotated or driven with rotation of the differential ring gear 38 of the differential device 20. The first supply passage 66 connected to an outlet port of the first oil pump P1 is configured to supply the oil to the lubrication-required elements of the drive-force transmitting mechanism 16. The lubrication-required elements, which are to be lubricated by the oil pumped up by the first oil pump P1, are mainly gears such as the gears 28, 30, 36 which are disposed in the gear room 58 and which constitute the output portion 16b of the drive-force transmitting mechanism 16, and bearings such as the bearings 49a, 49b, 59a, 59b, 62a, 62b that rotatably support rotary shafts of the gears. The first oil pump P1, which is driven with rotation of the differential ring gear 38 of the differential device 20, is driven even during EV running mode in which rotation of the engine 12 is stopped, so as to be capable of sucking the oil at a rate that is substantially proportional with the vehicle running speed V and supplying the oil to the lubrication-required elements. That is, the running speed V corresponds to a pump rotational speed of the first oil pump P1 and corresponds to a rate of the oil discharged from the first oil pump P1. Although the differential device 20 and the bearings 62a, 62b rotatably supporting the differential device 20 are lubricated by the oil scooped up by the differential ring gear 38, the differential device 20 and the bearings 62a, 62b can be lubricated by also a part of the oil supplied from the first supply passage 66, which is moved along, for example, ribs of the casing 40.

In the lubrication device 64, a catch tank 90 is provided in a given position, which is located on an upper side of the bearing 47a supporting the rotor shaft 46 of the first electric motor MG1 in the vertical direction in a state (hereinafter referred to as "apparatus installed state") in which the drive-force transmitting apparatus 10 is installed in the vehicle 8. The catch tank 90 is in communication with an introduction hole 92, for supplying the oil to the bearing 47a that supports the rotor shaft 46 of the first electric motor MG1. Thus, when a level of the oil stored in the catch tank 90 reaches a height of the introduction hole 92, the oil is supplied to the bearing 47a through the introduction hole 92 and a third supply passage 94. Thus, the catch tank 90 is provided to store the oil that is to be supplied to the bearing 47a through which the rotor shaft 46 of the first electric motor MG1 is held by the casing 40. To the catch tank 90, the oil scooped up by gears such as the differential ring gear 38 is supplied.

Figure 3:
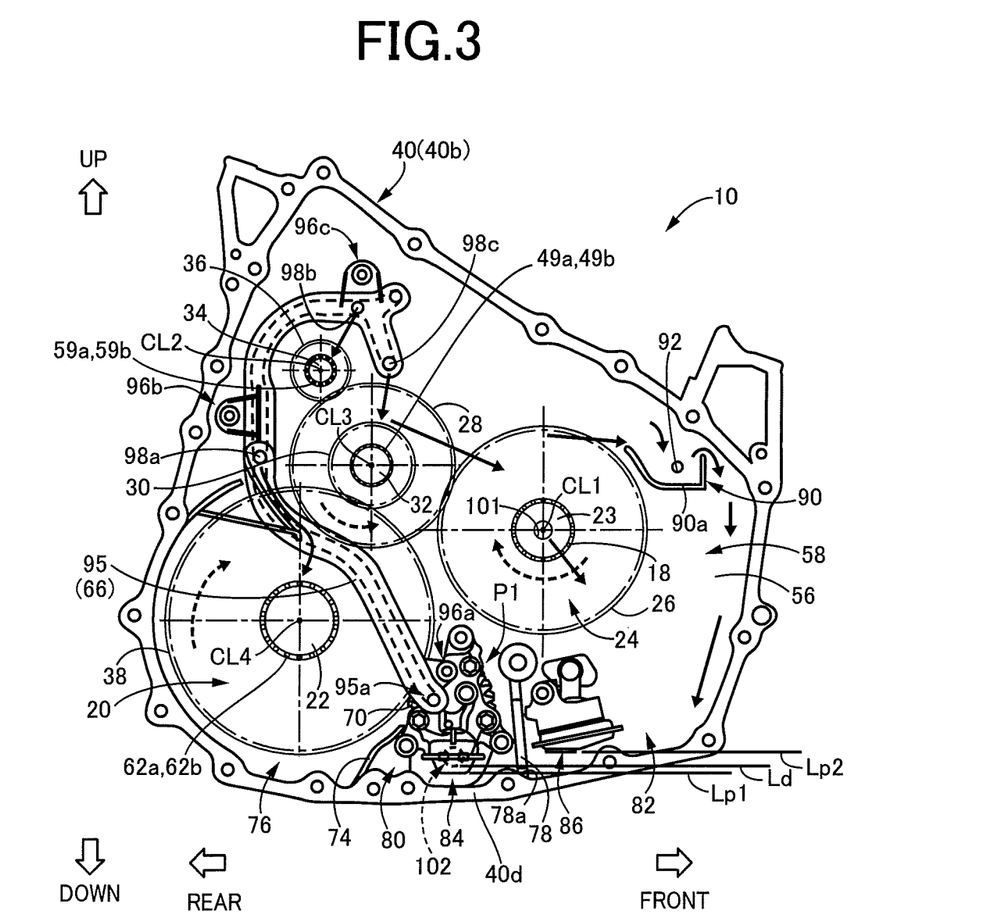
FIG. 3 is view for explaining construction of the lubrication device provided in a gear room of a casing shown in FIG. 1.

FIG. 3 is a view for explaining construction of the lubrication device 64 that is disposed within the gear room 58 of the casing 40. The view of FIG. 3 shows inside of the gear room 58 in the apparatus installed state, as seen from side of the engine 12 in the direction of the first axis CL1. The casing 40 shown in FIG. 3 is, precisely, the axle case 40b which cooperates with the housing 40a and the case cover 40c to constitute the casing 40. It is noted that the apparatus installed state is a state in which the drive-force transmitting apparatus 10 is installed in the vehicle 8 and the vehicle 8 is on a horizontal road surface.

In FIG. 3, solid-line circle and one-dot chain line circle, whose centers lie at the first axis CL1, represent an addendum circle and a pitch circle of the output gear 26, respectively, which is to be rotated about the first axis CL1. Further, solid-line circle and one-dot chain line circle, whose centers lie at the second axis CL2, represent an addendum circle and a pitch circle of the reduction gear 36, respectively, which is to be rotated about the second axis CL2. Still further, solid-line circle and one-dot chain line circle of a larger diameter, whose centers lie at the third axis CL3, represent an addendum circle and a pitch circle of the counter gear 28, respectively, which is to be rotated about the third axis CL3, and solid-line circle and one-dot chain line circle of a smaller diameter, whose centers lie at the third axis CL3, represent an addendum circle and a pitch circle of the differential drive gear 30, respectively, which is to be rotated about the third axis CL3. Moreover, solid-line circle and one-dot chain line circle, whose centers lie at the fourth axis CL4, represent an addendum circle and a pitch circle of the differential ring gear 38 (differential device 20), respectively, which is to be rotated about the fourth axis CL4. The first through fourth axes CL1-CL4 are parallel to one another, and each one of the first through fourth axes CL1-CL4 is distant from any one of the others of the first through fourth axes CL1-CL4 in a given direction, wherein the given direction is a direction including a component of the vertical direction and a component of the horizontal direction in the apparatus installed state.

As shown in FIG. 3, the first and second inlet ports 84, 86 of the respective first and second oil pumps P1, P2 are provided in a lower portion of the casing 40 in the vertical direction in the apparatus installed state. Further, in the lower portion of the casing 40, the first and second partition walls 74, 78 are provided to extend generally upwardly from a bottom wall 40d of the casing 40 which are opposed to openings of the respective first and second inlet ports 84, 86 and which defines the oil storage portion 72 in which the oil is stored. The second storage portion 80 is defined at its front and rear end by the second partition wall 78 and the first partition wall 74, respectively, in the vehicle longitudinal direction. The first inlet port 84 of the first oil pump P1 is located in the second storage portion 80.

The second storage portion 80 and the first storage portion 76 are located on respective front and rear sides of the first partition wall 74 in the vehicle longitudinal direction. With the differential ring gear 38 being partially immersed in the oil stored in the first storage portion 76, the oil stored in the first storage portion 76 is scooped up by the differential ring gear 38 when the differential ring gear 38 is rotated during running of the vehicle 8, whereby the oil is supplied to the lubrication-required elements of the drive-force transmitting mechanism 16 disposed in the gear room 58.

The third storage portion 82 and the second storage portion 80 are located on respective front and rear sides of the second partition wall 78 in the vehicle longitudinal direction. The second inlet port 86 is located in the third storage portion 82. The oil sucked through the second inlet port 86 is supplied to the second oil pump P2 through a suction passage (not shown) that connects between the second inlet port 86 and the second oil pump P2.

The first oil pump P1 is located right above the first inlet port 84. The first oil pump P1 is driven by the pump drive gear 70 that meshes with the differential ring gear 38. With the first oil pump P1 being driven, the oil stored in the second storage portion 80 is sucked through the first inlet port 84, and the sucked oil is discharged to the first supply passage 66 that is connected to the outlet port of the first oil pump P1.

The first supply passage 66 is constituted by a hollow oil pipe 95 in which an oil passage is defined as indicated by broken lines, as shown in FIG. 3. The oil pipe 95 is fixed to the casing 40 through a plurality of attaching members 96a-96c. The oil pipe 95 is connected at its proximal end portion 95a as one of opposite end portions to the first oil pump P1, and is fixed at the other of the opposite end portions to the casing 40. The oil pipe 95 extends from the first oil pump P1 generally upwardly in the apparatus installed state, while being fixed to the casing 40. The oil pipe 95 is constituted by, for example, a synthetic resin pipe. A metal reinforcement member may be additionally provided in the synthetic resin pipe, for example, by insert molding.

The oil pipe 95 is provided with a plurality of hollow nozzles 98a-98c through which the oil is to be supplied to the lubrication-required elements such as the gears and bearings disposed within the gear room 58. Each of the nozzles 98a-98c extends in parallel to the first axis CL1, to a position that overlaps with a corresponding one or ones of the lubrication-required elements in a direction perpendicular to the first axis CL1. Further, each of the nozzles 98a-98c has an emission hole 100 (see FIG. 2) from which the oil flowing inside the nozzle is to be emitted toward a corresponding one or ones of the lubrication-required elements.

Thus, a part of the oil, which is sucked by the first oil pump P1 and discharged to the oil pipe 95, passes through the nozzles 98a-98c and is emitted from the emission holes 100 of the nozzles 98a-98c, so as to be supplied to the lubrication-required elements.

For example, the oil emitted from the emission hole 100 of the nozzle 98a, which is provided in a longitudinally intermediate portion of the oil pipe 95, is moved along a rib or the like provided in the casing 40, as indicated by solid line in FIG. 3, so as to be supplied to, for example, the differential device 20 and the bearings 62a, 62b that rotatably support the differential device 20. Further, the oil emitted from the emission hole 100 of the nozzle 98b, which is provided in a distal end portion of the oil pipe 95, is supplied to the bearings 59a, 59b that rotatably support the reduction gear 36 and the drive-force transmitting shaft 34, as indicated by solid line in FIG. 3. Still further, the oil emitted from the emission hole 100 of the nozzle 98c, which is provided in the distal end portion of the oil pipe 95, is supplied to the counter gear 28, the differential drive gear 30 and the bearings 49a, 49b that rotatably support the counter shaft 32 (on which the gears 28, 30 are disposed), as indicated by solid line in FIG. 3. Thus, the rotary members such as the differential device 20, reduction gear 36, counter gear 28 and differential drive gear 30 constituting the output portion 16b are lubricated by the oil pumped up by the second oil pump P2. Further, a part of the oil emitted from nozzles such as the nozzle 98c is stirred by the counter gear 28 and the differential drive gear 30 so as to be scattered to be supplied to the bearing 18 and other bearings rotatably supporting the planetary gear device 24 and input shaft 23. That is, the planetary gear device 24 and other rotary members constituting the input portion 16a are lubricated by the oil pumped up by the first oil pump P1 as well as by the oil pumped up by the second oil pump P2.

The catch tank 90 is located in a given position relative to the bearing 47a and the output gear 26, wherein the given position is located on an upper side, in the vehicle vertical direction, of the bearing 47a and on a front side, in the vehicle longitudinal direction, of the output gear 26, in the apparatus installed state. The catch tank 90 is constituted by a rib 90a that is provided to protrude from the partition wall 56 of the casing 40 in a direction which is parallel to the first axis CL1 and which perpendicular to the partition wall 56. The rib 90a is formed integrally with the casing 40 by casting. The catch tank 90 has generally a U shape in its cross section, and opens upwardly in the vertical direction, such that the oil scooped up by gears such as the differential ring gear 38 is stored in the catch tank 90.

During forward running of the vehicle 8, the differential ring gear 38 is rotated in clockwise direction as indicated by arrow (represented by broken line) in FIG. 3. With rotation of the differential ring gear 38 in the clockwise direction, the counter gear 28 and the differential drive gear 30 are rotated in counterclockwise direction as indicated by arrow (represented by broken line) in FIG. 3 while the output gear 26 is rotated in clockwise direction as indicated by arrow (represented by broken line) in FIG. 3. In this instance, the oil stored in the first storage portion 76 is scooped up by the differential ring gear 38 so as to be supplied to various parts of the drive-force transmitting mechanism 16 disposed in the gear room 58. Further, a part of the oil scooped by the differential ring gear 38 is scattered and moved toward the catch tank 90, or the part of the oil scooped by the differential ring gear 38 is stirred by gears such as the differential drive gear 30 and the output gear 26 whereby the part of the oil is scattered and moved toward the catch tank 90. Thus, the part of the oil scooped up by the differential ring gear 38 is stored in the catch tank 90.

Further, a part of the oil pumped up by the second oil pump P2 is supplied to an axial-direction passage 101 which is formed inside the input shaft 23 so as to extend in parallel to the first axis CL1, and is scattered in a radial direction from the input shaft 23 through radial-direction passages (not shown) that is in communication with the axial-direction passage 101, whereby the planetary gear device 24, bearing 18 and other members constituting the input portion 16a are lubricated by the part of the oil pumped by the second oil pump P2.

By the way, the housing 40a of the casing 40 is provided with a drain hole 102 (see FIG. 1) through which the oil stored in the oil storage portion 72 as the bottom portion of the casing 40 is to be discharged to an exterior of the casing 40. The drain hole 102 is normally closed by a drain plug 104. When the oil is to be changed to new oil, the drain plug 104 is dropped or removed from the drain hole 102 whereby the oil stored in the casing 40 is discharged through the drain hole 102 to the exterior of the casing 40. There could be a case in which the oil leaks or is discharged through the drain hole 102 during running of the vehicle 8, for example, in the event of removable of the drain plug 104 from the drain hole 102, and the vehicle 8 runs in an oil-less state in which the oil is absent or deficient in an interior of the casing 40. In this case, there is a risk that galling could be caused in the drive-force transmitting mechanism 16 due to shortage of the oil supplied to the drive-force transmitting mechanism 16. In the present embodiment, the drain hole 102 is provided in a position as described below, for restraining the galling in the drive-force transmitting mechanism 16.

In FIG. 3, a position of the drain hole 102, when the casing 40 is assembled, is indicated by a circle that is located above the first inlet port 84 of the first oil pump P1, wherein the circle is represented by broken line. It is noted that the drain hole 102 is actually formed in the housing 40a, so that the position of the drain hole 102 indicated by the circle (broken line) represents a portion of the axle case 40b that is opposed to the drain hole 102 in a direction parallel to the first through fourth axes CL1-CL4 when the casing 40 is assembled, namely, when the housing 40a is attached to the axle case 40b.

As shown in FIG. 3, in the apparatus installed state, a position Lp1 of opening of the first inlet port 84 (or position Lp1 of a lower end of the opening of the first inlet port 84) of the first oil pump P1 is lower than a position Ld of a lower end of the drain hole 102 in the vertical direction. Further, in the apparatus installed state, a position Lp2 of opening of the second inlet port 86 (or position Lp2 of a lower end of the opening of the second inlet port 86) of the second oil pump P2 is higher than the position Ld of the lower end of the drain hole 102 in the vertical direction. In other words, a distance from the bottom wall 40d of the casing 40 to the position Lp1 of the opening of the first inlet port 84 of the first oil pump P1 is smaller than a distance from the bottom wall 40d to the position Ld of the lower end of the drain hole 102, while a distance from the bottom wall 40d to the position Lp2 of the opening of the second inlet port 86 of the second oil pump P2 is larger than the distance from the bottom wall 40d to the position Ld of the lower end of the drain hole 102. It is noted that the position Lp1 of opening of the first inlet port 84 corresponds to "position of opening of said inlet port of said first oil pump" recited in the appended claims and that the position Lp2 of opening of the second inlet port 86 corresponds to "position of opening of said inlet port of said second oil pump" recited in the appended claims.

There will be described effects and advantages provided by the above-described positional relationship among the position Lp1 of the opening of the first inlet port 84, the position Lp2 of the opening of the second inlet port 86 and the position Ld of the lower end of the drain hole 102 in the apparatus installed state.

During forward running of the vehicle 8, if the drain plug 104 is dropped or removed from the drain hole 102, for example, the oil stored in the interior of the casing 40 is discharged through the drain hole 102. However, in such a case, since the position Ld1 of the opening of the first inlet port 84 of the first oil pump P1 is lower than the position Ld of the lower end of the drain hole 102 in the vertical direction, the oil stored in a low portion of the casing 40 which is lower than the position Ld of the lower end of the drain hole 102 in the vertical direction, is not discharged through the drain hole 12 from the casing 40 and remains in the casing 40. Therefore, the first oil pump P1 can pump up the oil remaining in the second storage portion 80, so that the drive-force transmitting mechanism 16 can be lubricated by the oil pumped by the first oil pump P1. In this instance, a part of the oil pumped up by the first oil pump P1 is supplied to the counter gear 28 and other rotary members, and is stirred by the counter gear 28 and other rotary members so as to be scattered toward the planetary gear device 24 whereby the planetary gear device 24, output gear 26, bearing 18 and other rotary members are also lubricated. Thus, the drive-force transmitting mechanism 16, which is to be lubricated by mainly the oil pumped up by the second oil pump P2, is lubricated by also the oil pumped up by the first oil pump P1, so that galling of the planetary gear device 24, output gear 26, bearing 18 and other rotary members is restrained.

If the drain plug 104 is removed and the oil level becomes lower than the position Lp2 of opening of the second inlet port 86, the oil is not discharged from the second oil pump P2 whereby a temperature of the oil remaining in the second oil pump P2 is increased. In view of this, in the present embodiment, the second oil pump P2 is provided with an oil temperature sensor 106 (see FIG. 1) that is configured to detect a temperature of the oil in the second oil pump P2, so that the oil-less state can be detected in an early stage, based on a difference between the oil temperature detected by the oil temperature sensor 106 and an oil temperature detected by another oil temperature sensor (e.g., oil temperature sensor provided in the first oil pump P1). By detecting the oil-less state in an early stage, it is possible to cope with the oil-less state in an early stage, and accordingly to restrain galling in the drive-force transmitting mechanism 16. It is noted that the oil-less state may be detected based on a rate of increase of the oil temperature detected by the oil temperature sensor 106. Further, a sensor configured to detect a rate of the oil discharged from the second oil pump P2 may be provided, and the oil-less state may be detected based on the oil discharge rate detected by the sensor. In other words, it is also possible to interpret that the rate of the oil discharged from the second oil pump P2 can be estimated or obtained based on the oil temperature in the second oil pump P2, which is detected by the oil temperature sensor 106. In this sense, the oil temperature sensor 106 can be considered to correspond to "oil discharge-rate obtainer" recited in the appended claims.

As described above, in the present embodiment, even in a case in which the oil becomes substantially absent in the interior of the casing 40, namely, even in a case in which the interior of the casing 40 is placed in the oil-less state, the first oil pump P1 can suck the oil remaining in a low portion of the interior of the casing 40 which is lower than the lower end of the drain hole 102, so that it is possible to lubricate the drive-force transmitting mechanism 16 by using the oil pumped up by the first oil pump P1. Further, in this case, the second oil pump P2 is unable to suck the oil, thereby causing a situation in which the oil is not discharged from the second oil pump P2 and/or a situation in which the temperature of the oil is increased. Thus, the oil-less state can be detected in an early stage thereby making possible to cope with the oil-less state. Therefore, it is possible to restrain occurrence of the galling in the drive-force transmitting mechanism 16.

Further, in the present embodiment, the first oil pump P1 is driven by the differential ring gear 38 of the differential device 20 constituting the output portion 16b, and the oil pumped up by the first oil pump P1 is supplied to the output portion 16b that is constituted by the differential device 20 and other elements, so that the output portion 16b can be suitably lubricated. Further, the second oil pump P2 is driven by the input shaft 23 constituting the input portion 16a, and the oil pumped up by the second oil pump P2 is supplied to the input portion 16a that is constituted by the planetary gear device 24 and other elements, so that the input portion 16a can be suitably lubricated. Moreover, the input portion 16a constituted by the planetary gear device 24 and other elements is lubricated by the oil pumped up by the first oil pump P1 as well as by the oil pumped up by the second oil pump P2, so that the input portion 16a can be further suitably lubricated.

While the preferred embodiment of this invention has been described in detail by reference to the drawings, it is to be understood that the invention may be otherwise embodied.

In the above-described embodiment, the first oil pump P1 is to be driven by rotation of the differential ring gear 38 of the differential device 20. However, the first oil pump P1 may be modified, for example, such that the first oil pump P1 is to be driven by rotation of another rotary member such as the differential drive gear 30, as long as the other rotary member constitutes the output portion 16b. Further, in the above-described embodiment, the second oil pump P2 is to be driven by rotation of the input shaft 23. However, the second oil pump P2 may be modified, for example, such that the second oil pump P2 is to be driven by rotation of another rotary member such as the carrier CA of the planetary gear device 24, as long as the other rotary member constitutes the input portion 16a.

In the above-described embodiment, the vehicle 8 in which the drive-force transmitting apparatus 10 is to be installed is to be driven by the engine 12 as the drive force source. However, the present invention is applicable not only to the vehicle that is to be driven by the engine 12 as the drive force source but may be applicable also to an electric vehicle that is to be driven by an electric motor as the drive force source.

In the above-described embodiment, the second oil pump P2 is to be driven by rotation of the engine 12. However, the second oil pump P2 does not necessarily have to be driven by the engine 12 but may be an electrically-operated oil pump that is to be driven by an electric motor.

In the above-described embodiment, the drive-force transmitting apparatus 10 is to be installed in the vehicle 8 of FF system. However, the present invention is applicable also to a vehicle of FR (front engine/rear drive) system.

In the above-described embodiment, the drive-force transmitting mechanism 16 includes rotary members each of which is to be rotated about a corresponding one of the first through fourth axes CL1-CL4. However, the rotary elements included in the drive-force transmitting apparatus do not necessarily have to be rotated about the four axes CL1-CL4, but may be rotated about three axes.

It is to be understood that the embodiment described above is given for illustrative purpose only, and that the present invention may be embodied with various modifications and improvements which may occur to those skilled in the art.

NOMENCLATURE OF ELEMENTS

8: vehicle
10: vehicle drive-force transmitting apparatus
12: engine (drive force source)
14: drive wheels
16: drive-force transmitting mechanism
16a: input portion
16b: output portion
40: casing
46: rotor shaft (rotary member)
84: first inlet port (inlet port of first oil pump)
86: second inlet port (inlet port of second oil pump)
102: drain hole
P1: first oil pump
P2: second oil pump
Ld: position of lower end of drain hole
Lp1: position of opening (position of opening of inlet port of first oil pump)
Lp2: position of opening (position of opening of inlet port of second oil pump)

What is claimed is:

1. A drive-force transmitting apparatus that is to be installed in a vehicle including a drive force source and drive wheels, said drive-force transmitting apparatus comprising:
a casing;
a drive-force transmitting mechanism which is disposed in said casing and which is configured to transmit a drive force from the drive force source and to the drive wheels; and
first and second oil pumps which are disposed in said casing and which are configured to suck, through respective inlet ports thereof, oil stored in a bottom portion of said casing, such that said drive-force transmitting mechanism is lubricated by the oil pumped up by said first and second oil pumps,
wherein said casing is provided with a drain hole through which the oil stored in said bottom portion of said casing is to be discharged to an exterior of said casing, and
wherein a position of opening of said inlet port of said first oil pump is lower than a position of a lower end of said drain hole, and a position of opening of said inlet port of said second oil pump is higher than the position of the lower end of said drain hole, in an apparatus installed state in which said drive-force transmitting apparatus is installed in the vehicle.

2. The drive-force transmitting apparatus according to claim 1,
wherein said drive-force transmitting mechanism includes an output portion configured to output the drive force to the drive wheels,
wherein said first oil pump is to be driven by said output portion, and wherein said output portion is to be lubricated by the oil pumped up by said first oil pump.

3. The drive-force transmitting apparatus according to claim 2,
wherein said drive-force transmitting mechanism includes an input portion configured to receive the drive force from the drive force source,
wherein said second oil pump is to be driven by said input portion, and
wherein said input portion is to be lubricated by the oil pumped up by said second oil pump.

4. The drive-force transmitting apparatus according to claim 3,
wherein said input portion is to be lubricated by the oil pumped up by said first oil pump as well as by the oil pumped up by said second oil pump.

5. The drive-force transmitting apparatus according to claim 1,
wherein an oil storage portion as said bottom portion of said casing in which the oil is to be stored, is defined by a bottom wall of said casing, said bottom wall being opposed to said opening of said inlet port of said first oil pump and said opening of said inlet port of said second oil pump,
wherein a distance from said bottom wall to the position of said opening of said inlet port of said first oil pump is smaller than a distance from said bottom wall to the position of the lower end of said drain hole, and
wherein a distance from said bottom wall to the position of said opening of said inlet port of said second oil pump is larger than the distance from said bottom wall to the position of the lower end of said drain hole.

6. The drive-force transmitting apparatus according to claim 1, further comprising an oil discharge-rate obtainer configured to obtain a rate of discharge of the oil from said second oil pump.

* * * * *